United States Patent
White et al.

(10) Patent No.: US 7,434,723 B1
(45) Date of Patent: Oct. 14, 2008

(54) MOBILE PAYMENT AUTHORIZATION SYSTEM AND METHOD

(75) Inventors: Brian H. White, Leawood, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 350 days.

(21) Appl. No.: 11/138,563

(22) Filed: May 26, 2005

(51) Int. Cl.
*G06F 17/00* (2006.01)

(52) U.S. Cl. ..................... 235/375
(58) Field of Classification Search ............... 235/375
See application file for complete search history.

(56) References Cited

U.S. PATENT DOCUMENTS

| | | | |
|---|---|---|---|
| 6,223,291 B1 * | 4/2001 | Puhl et al. | 726/28 |
| 2002/0116329 A1 * | 8/2002 | Serbetcioglu et al. | 705/39 |

OTHER PUBLICATIONS

Savage, Terry, "New Visa card Gives parents teen control," Chicago Sun-Times, Aug. 28, 2002, 2 pgs.
"Orbiscom Introduces ControlplayTM for Authorized User Solution—New Payment Solution Lifts The Barriers To Increased Card Usage Among Teens And Young Adults By Offering Parents Enhanced Control, Convenience And Peace Of Mind; Solution Also Supports MasterCards's FamilyAccountTM Initiative," Apr. 9, 2003, 2 pgs.
"Smart Cards: The Future of Electronic Payments," A White Paper, VeriFone, 18 pgs.
Zhu, Weiwen, "Over-the-Air Card Provisioning System and Method," Filing Date—Dec. 23, 2003, U.S. Appl. No. 10/744,169, Specification (41 pgs) and Drawings (10 sheets).
Zhu, Kevin, "Context-Based Card Selection Device," Filing Date—Jul. 28, 2004, U.S. Appl. No. 10/901,630, Specification (22 pgs) and Drawings (2 sheets).
"Payments software enabling the purchase of premium servicesTM—Case studies: Japan," 3 pgs.

* cited by examiner

*Primary Examiner*—Jamara A Franklin

(57) ABSTRACT

A system and method of completing a pending purchase is provided. The system and method comprises receiving purchase information by a first communication device from a point-of-sale device. The system and method also comprises transmitting a subscriber approval request from the first communication device to a second device, wherein the subscriber approval request includes the purchase information. The system and method further comprises providing payment information from the first communication device to the point-of-sale device to complete the pending purchase based on a subscriber approval response.

15 Claims, 10 Drawing Sheets

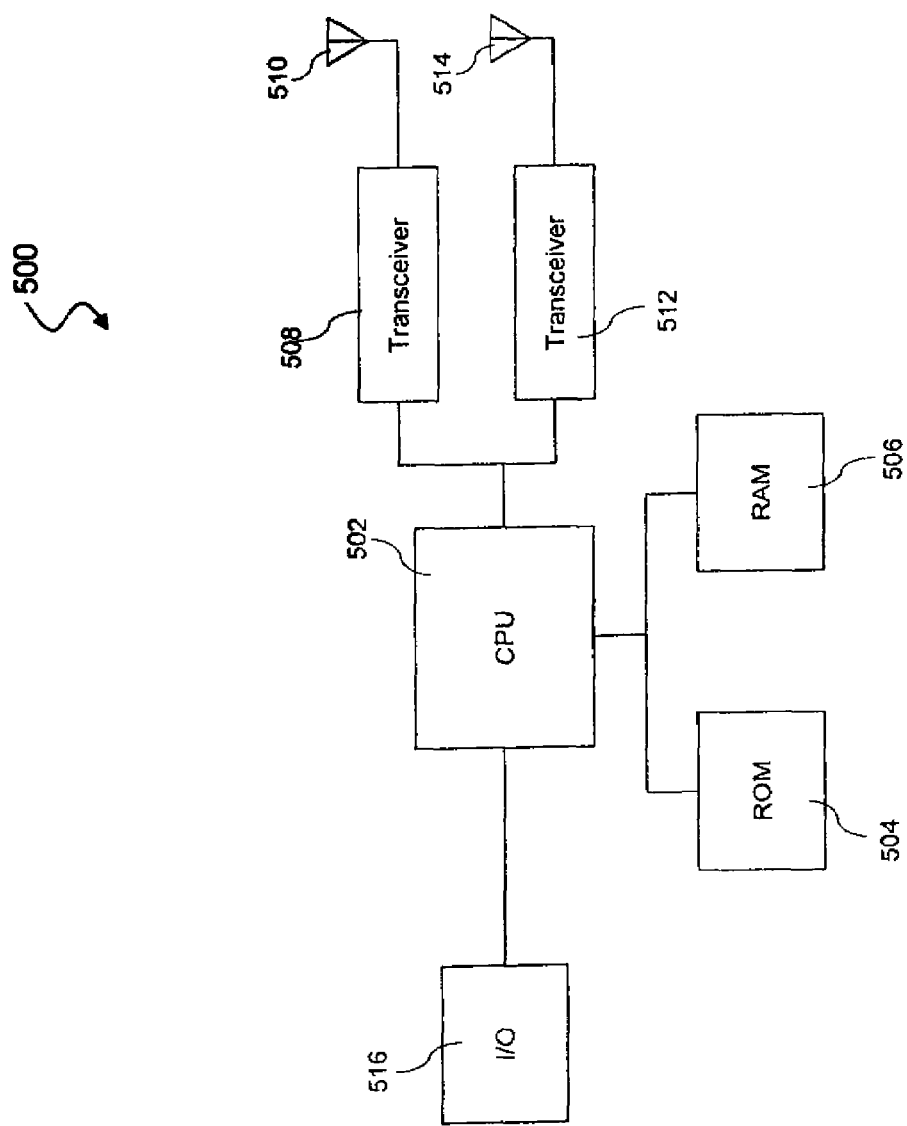

MOBILE PAYMENT AUTHORIZATION SYSTEM AND METHOD

CROSS-REFERENCE TO RELATED APPLICATIONS

This application includes subject matter related to U.S. patent application Ser. No. 10/901,630, filed Jul. 28, 2004, entitled "Context-based card selection device," by Kevin Zhu, which is incorporated herein for reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a payment approval system, and more particularly, but not by way of limitation, to a system and method for mobile payment approval.

BACKGROUND OF THE INVENTION

The convergence of wireless telephony technologies and the Internet has ignited an evolution of distributed information technology systems. Information technology systems include information services that enable users with a myriad of functions, such as the ability to purchase services and/or goods at anytime and at any place in the world.

SUMMARY OF THE INVENTION

An embodiment of the present disclosure is a method of completing a pending purchase. The method comprises receiving purchase information by a first communication device from a point-of-sale device. The method also comprises transmitting a subscriber approval request from the first communication device to a second device, wherein the subscriber approval request includes the purchase information. The method further comprises providing payment information from the first communication device to the point-of-sale device to complete the pending purchase based on a subscriber approval response.

In an embodiment, a system for subscriber payment approval is provided. The system comprises a first communication device operable to obtain purchase information from a point-of-sale system and to provide payment information to the point-of-sale system to complete a purchase. The system also comprises a second communication device in communication with the first communication device and operable to respond to a request from the first communication device to approve the first communication device to provide the payment information.

In an embodiment, an information technology system operable for supporting subscriber payment approval is provided. The information technology system comprises an information technology infrastructure operable to promote management of rules related to payment approval. The information technology system also comprises a first communication device in communication with the information technology infrastructure, wherein the first communication device is operable to obtain purchase information from a point-of-sale system and to provide payment information to the point-of-sale system to complete a purchase. The information technology system further comprises a second communication device in communication with the first communication device, wherein the second communication device is operable to respond to a request from the first communication device to approve the first communication device to provide the payment information.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5a is a block diagram of an embodiment of the present disclosure.

DETAILED DESCRIPTION OF THE PREFERRED EMBODIMENTS

Figure 1:
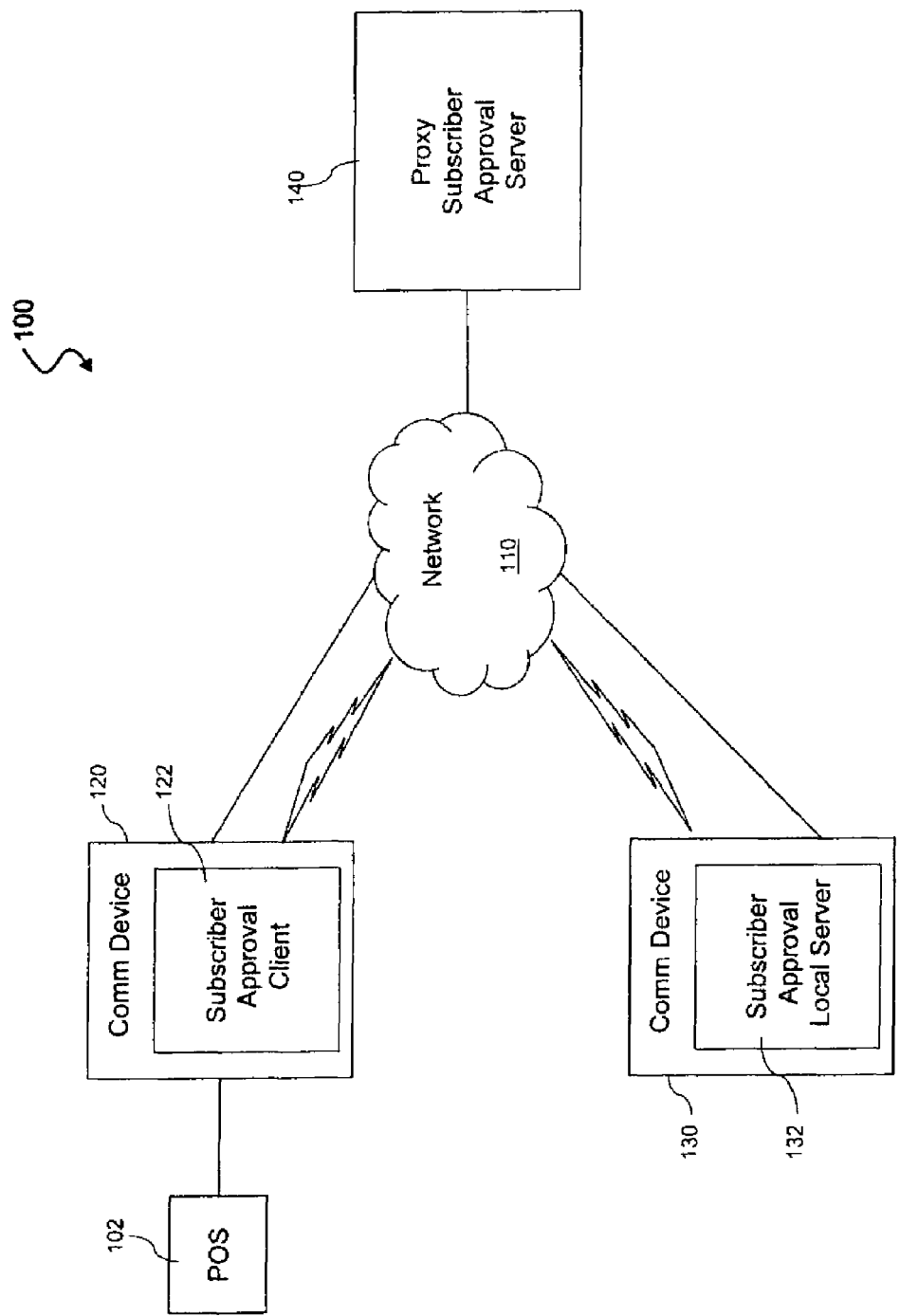
FIG. 1 is a block diagram of an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term data store may refer to various computer-based storage systems, protocols, lightweight directory access protocol (LDAP), and/or applications such as relational databases, directories, and other storage systems. The term application may refer to various computer-based systems and protocols, such as operating systems, spreadsheets, databases, functional programs, a software routine, and/or a collection of functions, at least one request for service, and/or other computer-based entities. It is to be further understood that the term application is not limited to the entities discussed, but may include other computer-based entities. The term response can mean both a response and a lack of a response, as for instance when no response is received from an entity to which a request has been sent and a time-out occurs and the lack of a response is interpreted as a rejection of the request.

Currently, the owner of a credit card can block or limit available credit to an authorized user of a credit card. The owner may limit an authorized user of the credit card to specific type of purchases and/or types of point-of-sale. The limitations are applied by the credit card company when a point-of-sale entity attempts to authorize payment from the credit card. The limitations may be defined by the credit card owner. However, the credit card owner may not readily revise the limitations at any time and/or on a purchase-by-purchase basis. Some of the embodiments discussed below contemplate a system and method for completing a pending purchase at a point-of-sale involving a purchase-by-purchase approval by the owner or controller of the credit card or other financial account, for example by a remote device or individual controlling the remote device. The system and method include one or more communication devices, wherein a first communication device participates in a transaction with a point-of-sale. A second communication device communicates with the first communication device to provide approval of the transaction with the point-of-sale system. The second communication device and/or the first communication device may also communicate with a proxy server wherein one or more rules may be stored. The rules may determine approval of transactions with a point-of-sale on behalf of the first communication device. Following approval, authorization is requested from the credit card company by the point-of-sale system, typically through normal means. The rules may also be resident in the second communication device and/or the first communication device. In an embodiment, the first communications device may be a mobile device such as a wireless handset. Following this approval, authorization is requested from the credit card company by the point-of-sale system, typically through normal means.

It is also understood that the embodiments discussed below may be implemented within a network of one or more wireless and/or wired computer-based entities. The embodiments discussed below are also not limited to only computer-based operation, but rather may also require interaction between multiple users and one or more computer-based entity.

Turning now to FIG. 1, a system 100 for subscriber payment approval is depicted. The system 100 includes a point-of-sale (POS) device 102, a network 110, a first communication device 120, a second communication device 130, and a proxy subscriber approval server 140. The network 110 interconnects the first communication device 120, the second communication device 130, and the proxy subscriber approval server 140 through wired and/or wireless communication.

The POS device 102 records sales and mediates payment for products or services. In credit card transactions, the POS device 102 may communicate with a credit card payment system to obtain payment or payment authorization. The POS device 102 may mediate payment from an electronic purse, a debit card, or other payment methods. The POS device 102 communicates with the first communication device 120 to provide purchase information and to receive, typically after the subscriber payment approval has been granted, payment information, such as credit card numbers. The POS device 102 may communicate with the first communication device 120 using a cord and plug, contact points, for example a docking station, or by non-contact means including radio frequency signals, infrared signals, audio frequency signals, and/or other non-contact methods.

The network 110 includes one or more systems that are adapted for routing information and/or enabling communication between one or more entities. The network 110 may also include the Internet, a telecommunication wired/wireless network, and/or other computer-based networked systems. The network 110 further includes wired and/or wireless routing systems such as wireless base stations adapted for transmitting information over wireless radio frequency.

The first communication device 120 and the second communication device 130 may be computer-based entities, such as personal digital assistants (PDAs), mobile phones, personal computers (PC), laptop computers, or traditional wireless or wire-line telephones. In the preferred embodiment, the first communication device 120 is a mobile communication device, such as a mobile telephone or mobile device. The first communication device 120 communicates with the second communication device 130 through the network 110.

In one embodiment, the first communication device 120 and the second communication device 130 may communicate through voice-based telephony, video conferencing, internet protocol, multimedia messaging service (MMS), short messaging service (SMS), email, instant text messaging, and/or other means of communication. The first and second communication devices 120 and 130 may be different types of devices using different means of communication. For example, the first communication device 120 may be a mobile telephone that sends the request for approval to the second communication device 130, which may be a personal computer that receives and responds to the request via email, instant messaging, or otherwise. When the second communication device 130 is a standard telephone, the user may key in an approval code on the key-pad. The first communication device 120 and the second communication device 130 may also include one or more data stores having information that may be required for determining subscriber payment approval. For example, the first communication device 120 and/or the second communication device 130 may include information such as a credit card number, a debit card number, other account information, and rules on which to base decisions.

The first communication device 120 is presented to the POS device 102. The POS device 102 communicates purchasing information to the first communication device 120 that may include purchase price, identity of the purchased item, identity of the vendor and/or location of the POS device 102. The first communication device 120 initiates a subscriber payment approval process that may involve the first communication device 120 communicating with the second communication device 130 to provide purchasing information to the second communication device 130 and the second communication device 130 determining approval and communicating approval to the first communication device 120. The first communication device 120 then provides credit card information, debit card information, or electronic purse information to the POS device 102 to complete the payment transaction.

In the event that the second communication device 130 does not acknowledge the communication of the first communication device 120, such as when the second communication device 130 is unavailable, the first communication device 120 may direct an approval request to the proxy subscriber approval server 140. The proxy subscriber approval server 140 performs the approval that otherwise the second communication device 130 would provide. This behavior may be considered a fall-back or optional response by the first communication device 120. In another embodiment, the first communication device 120 interprets the lack of response as equivalent to a response rejecting the request for approval and no approval request is directed to the proxy subscriber approval server 140.

In an embodiment, the first communication device 120 may include one or more adapters for communicating with the POS device 102. For example, the adapter may include a contactless chip operable to provide a communication link with a compatible device using contactless communication. The adapter may include a retractable magnetic tape card, which may be swiped through a magnetic tape card reader. The retractable magnetic tape card may be re-writeable by the first communication device such that one or more account numbers may be placed onto the retractable magnetic tape card. Of course, other adapters may include a wireless adapter, an infrared communication adapter, and/or other adapters. For subject matter related to communication link alternatives, see related U.S. patent application Ser. No. 10/901,630, filed Jul. 28, 2004, entitled "Context-based card selection device," by Kevin Zhu, which is incorporated herein for reference for all purposes.

The POS device 102 would acknowledge the presence of the account number provided by the adapter, and the first communication device 120 may simultaneously request approval of the pending purchase from the second communication device 130 and/or the proxy subscriber approval server 140. The adapter may also include other physical interfaces that provide compatibility with the POS device 102.

In one embodiment, the first communication device 120 includes a subscriber approval client 122. The subscriber approval client 122 may be enabled as a software program, an application, or a function. The subscriber approval client 122 may operate to collect pending purchase information from the POS device 102. For example, pending purchase information may include a description of a product and/or service, unit value, total cost of pending purchase, and/or other information. The subscriber approval client 122 also includes information for completing the pending purchase, such as account numbers, credit card numbers, and/or other information. The subscriber approval client 122 may also operate to communicate with the second communication device 130 and/or the proxy subscriber approval server 140 through the network 110.

Alternatively, the subscriber approval client 122 may operate to complete the pending purchase. For example, in one embodiment the subscriber approval client 122 may communicate with the proxy subscriber approval server 140. The proxy subscriber approval server 140 may include one or more applications and/or data stores having rules for approving the pending purchase, such rules may be modifiable by the second communication device 130. The rules of approval may also be resident on the first communication device 120.

The second communication device 130 also includes a subscriber approval local server 132. The subscriber approval local server 132 may be enabled as a software program, an application, or a function. The subscriber approval local server 132 may operate to collect pending purchase information from the POS device 102, the first communication device 120 and/or the proxy subscriber approval server 140. The subscriber approval local server 132 may include one or more applications and/or data stores having rules for approving a pending purchase. For example, a user of the second communication device 130 may create one or more rules dictating approval for specific types of transactions associated with the first communication device 120. The rules may approve the first communication device 120 to complete a purchase, and may approve the first communication device 120 based upon a description of a product and/or service, unit value, total cost of pending purchase, and/or other information. The rules may be formed utilizing a keyboard, voice commands to a microphone, and/or text keypad input on the second communication device 130. Alternatively, the rules may be formed utilizing a remote general-purpose computer through a web browser and/or other graphical user interface.

For purposes of illustration, the operation of the system 100 for subscriber payment approval may be employed for parental control of child spending at the POS device 102, in an embodiment. For example, a parent having the second communication device 130 may establish one or more rules for limiting the available funds of a child having the first communication device 120. The subscriber approval local server 132 may include one or more payment information associated with a credit card number, a debit card number, and/or other monetary account information. The subscriber approval local server 132 may also include the rules linked to the first communication device 120 and/or the proxy subscriber approval server 140. The rules established within the subscriber approval local server 132 may be invoked when the first communication device 120 interacts with the POS device 102. The subscriber approval local server 132 may apply the rules to approve payment via the subscriber approval client 122 without the intervention of the parent. Alternatively, the proxy subscriber approval server 140 may apply the rules to approve payment via the subscriber approval client 122. Thus, in one embodiment parental spending control of the child may be accomplished without having the second communication device 130 powered on or otherwise connected to the network 110. In the preferred mode an attempt is made to communicate to the second communication device 130 before the rules are invoked as a fall-back procedure. In an alternate embodiment, certain rules may allow for immediate approval while other rules require an attempt to communicate with the second communication device 130 before exercising the rule to determine approval as a fall-back procedure.

In one embodiment, the parent having the second communication device 130 may be alerted through voice, video, and/or text messaging, for example, when the first communication device 120 initiates the pending purchase with the POS device 102. The alert to the parent may include real-time pending purchase information. The parent may have the option of approving or rejecting the pending purchase. The approval or rejection may be acknowledged by keyboard, voice, video, and/or keypad input, for example, into the second communication device 130. For example, if the parent rejects the pending purchase, the first communication device 120 receives a rejection notification through the subscriber approval client 122. In one embodiment, the child may subsequently communicate with the parent to further describe and discuss the pending purchase with the parent, which may be referred to as disputing the rejection of the pending purchase. This communication link may be established using a push-to-talk button on the first communication device, by the system 100 automatically establishing a mobile phone call, or using a text message. If the parent agrees to allow the child to complete the pending purchase, the parent may provide input to the subscriber approval local server 132. The subscriber approval local server 132 subsequently allows the subscriber approval client 122 to complete the pending purchase with the POS device 102.

In another embodiment, a user of the second communication device 130 may include an employer (i.e., a boss or manager of a business) while, the first communication device 120 may be operated by an employee. The employer may in real-time control the pending purchase(s) made on behalf of the employee.

The proxy subscriber approval server 140 includes one or more computer-based entities, such as a general-purpose computer system. The proxy subscriber approval server 140 may also include one or more applications and/or functions operating in a computer-based entity. The proxy subscriber approval server 140 communicates with first communication device 120 and the second communication device 130 through the network 110. In one embodiment, the proxy subscriber approval server 140 operates to apply rules established by the second communication device 130. The rules may be applied by the subscriber approval client 122 without the intervention of the subscriber approval local server 132.

Figure 2A:
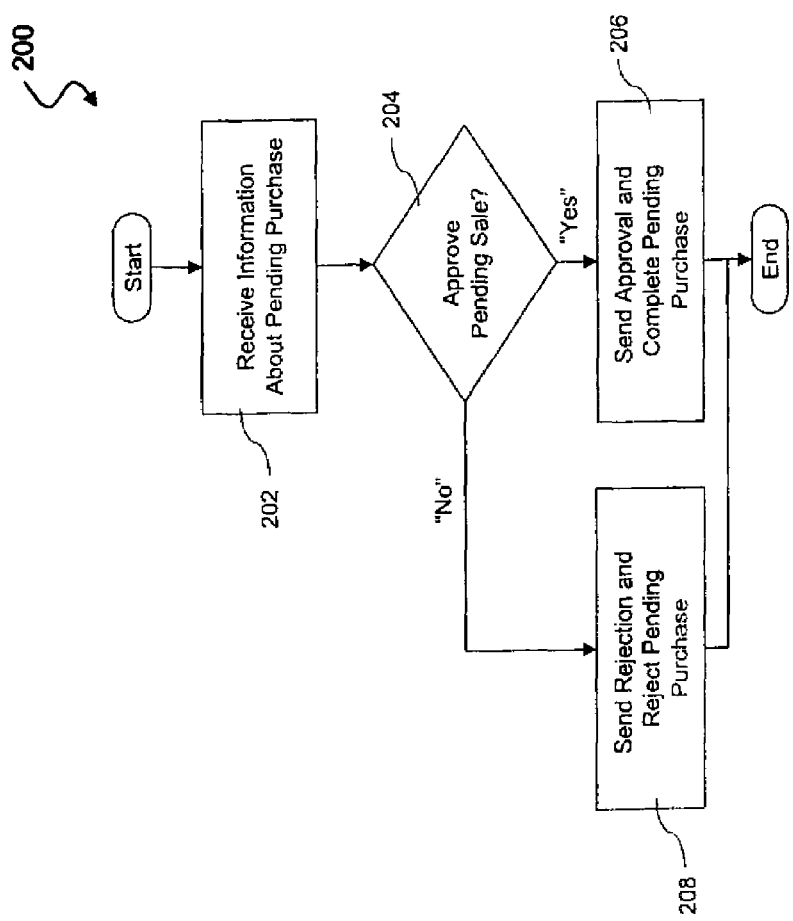
FIG. 2a is a flow diagram of one embodiment of a method for completing a pending purchase according to aspects of the present disclosure.

Turning now to FIG. 2a, a flow diagram depicts a process 200 for completing a pending purchase. In block 202, the subscriber approval local server 132 of the second communication device 130 receives pending purchase information. The pending purchase information includes information such as service and/or product description, sale price, description of the POS device 102, and/or other information. The pending purchase information may be collected by the subscriber approval client 122 of the first communication device 120.

The process flows to block 204 to decide whether to approve the pending purchase by the subscriber approval local server 132. The subscriber approval local server 132 may allow the second communication device 130 to view pending purchase information, and may operate to allow a user of the second communication device 130 to approve the pending purchase, in one embodiment. For example, the user of the second communication device 130 may approve the pending purchase through a keyboard, touch pad interface, video, and/or voice command. Alternatively, the pending purchase may be approved by one or more approval rules associated with the subscriber approval local server 132.

In block 206, if the pending purchase is approved, an approval notification is sent to the subscriber approval client 122, thereby allowing the pending purchase to be finalized. The POS device 102 receives payment information from the subscriber approval client 122, submits this payment information to an authorization entity, such as a financial institution, and receives a response back from the authorization entity. The process then exits.

In block 208, if the pending purchase is rejected a notice of rejection is sent to the subscriber approval client 122. The rejection may include a text message, a voice message, video, and/or graphical image expressing the rejection of the pending purchase. The user of the first communication device 120 is subsequently not allowed to complete the pending purchase with the POS device 102. The process then exits.

Figure 2B:
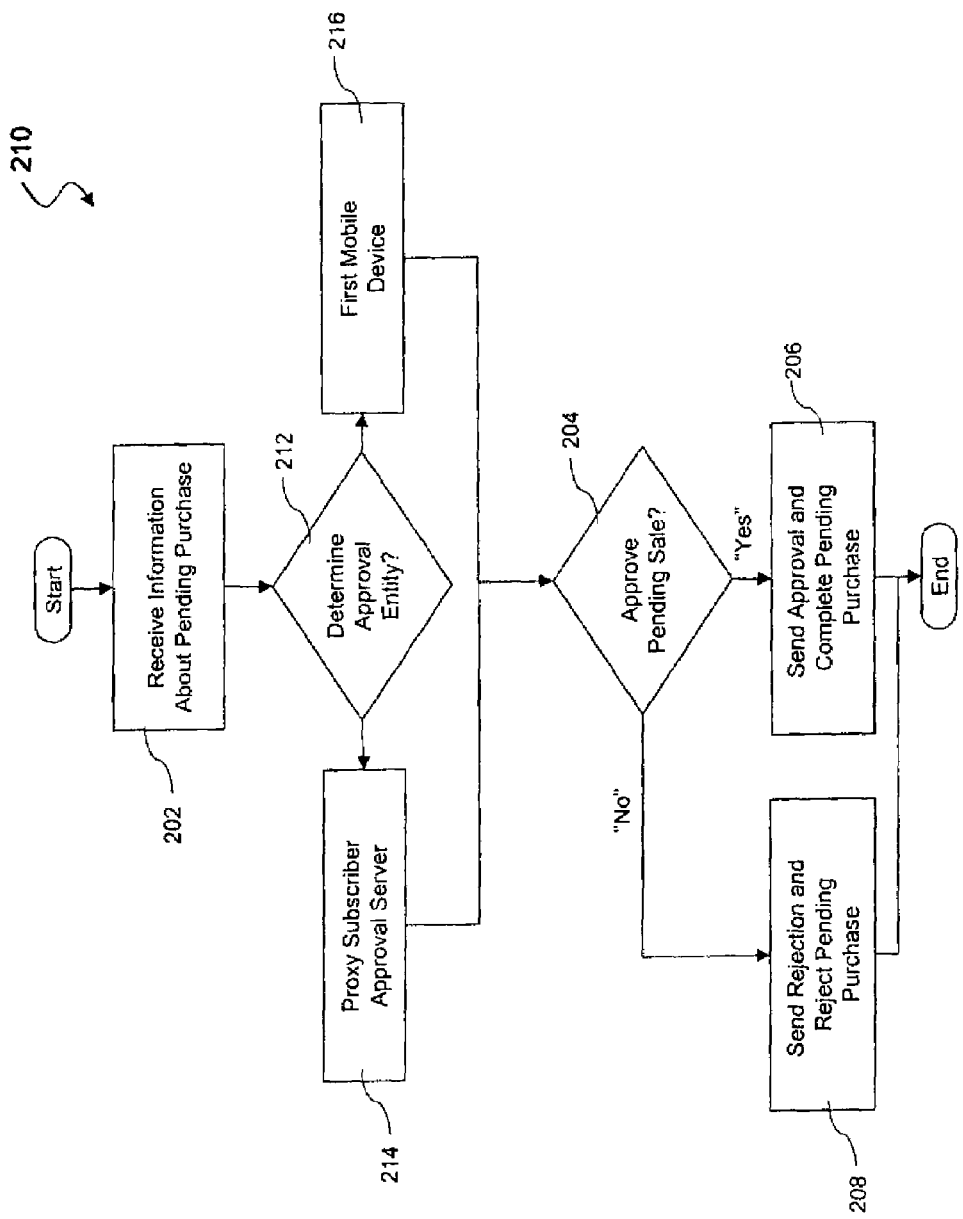
FIG. 2b is a flow diagram of an embodiment of a method for completing a pending purchase according to another aspect of the present disclosure.

Turning now to FIG. 2b, a flow diagram depicts a process 210 for completing a pending purchase. The process 210 for completing a pending purchase depicted in FIG. 2b is substantially similar to the process 200 depicted in FIG. 2a, with the exception that a decision to determine an approval entity is generated in block 212. For example, if the subscriber approval local server 132 is unable to respond to a request for approval from the subscriber approval client 122 after a predetermined time the process 210 may proceed to block 214 or to block 216.

In block 214 and block 216, the subscriber approval client 122 of the first communication device 120 may be selected to approve the pending purchase. The subscriber approval client 122 may be selected based upon one or more approval rules associated with the subscriber approval local server 132, in one embodiment. Alternatively, the proxy subscriber approval server 140 may be selected to approve the pending purchase.

Figure 2C:
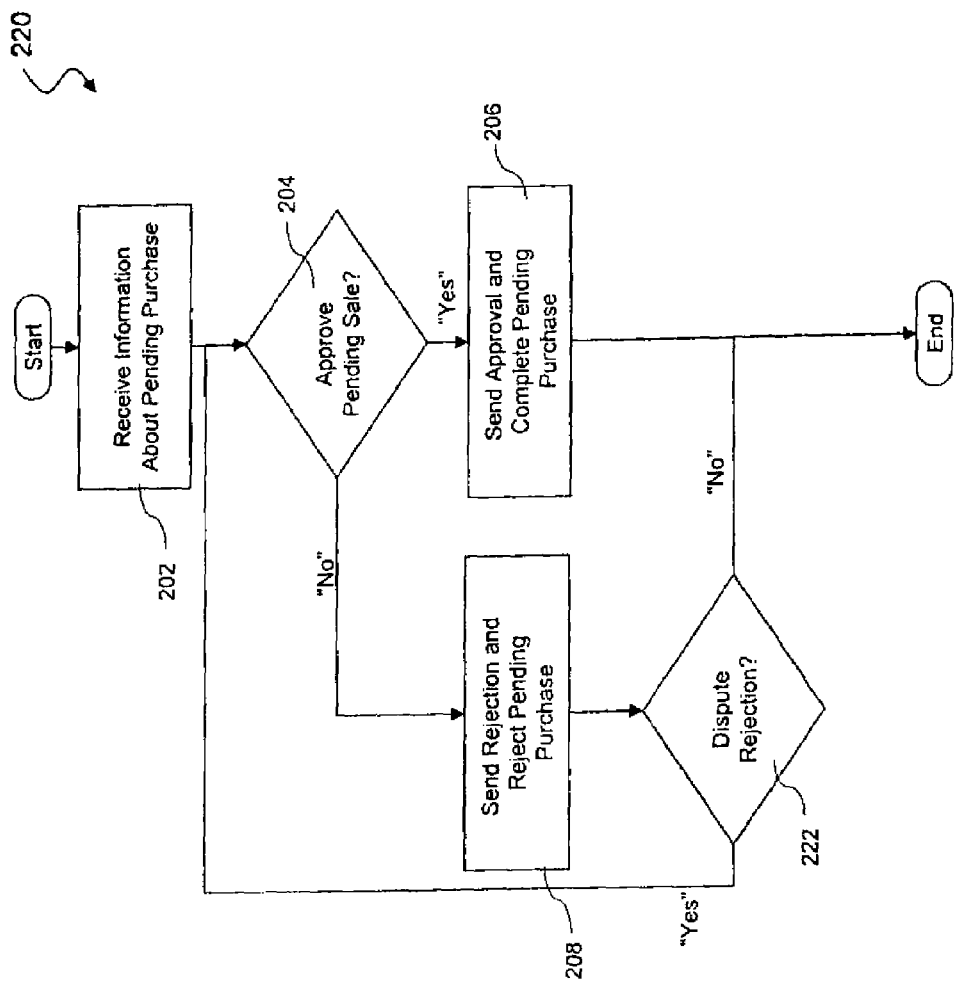
FIG. 2c is a flow diagram of another embodiment of a method for completing a pending purchase according to an aspect of the present disclosure.

Turning now to FIG. 2c, a flow diagram depicts a process 220 for completing a pending purchase. The process 220 for completing a pending purchase depicted in FIG. 2c is substantially similar to the process 200, 210 depicted in FIGS. 2a and 2b, with the exception that a decision to dispute the rejection of the pending purchase is performed by the user of the first communication device 120 is generated in block 222. For example, the first communication device 120 may communicate directly with the second communication device 130 to dispute the rejection of the pending purchase. The communication may include text, email, voice, multimedia, instant messaging, and/or other forms of communication. If the dispute between the user of first communication device 120 and the user of the second communication device 130 results in a decision to approve the pending purchase the process 220 flows to block 204. If the dispute between the user of first communication device 120 and the user of the second communication device 130 continues to result in the denial of the pending purchase, the process 220 then exits.

Figure 3:
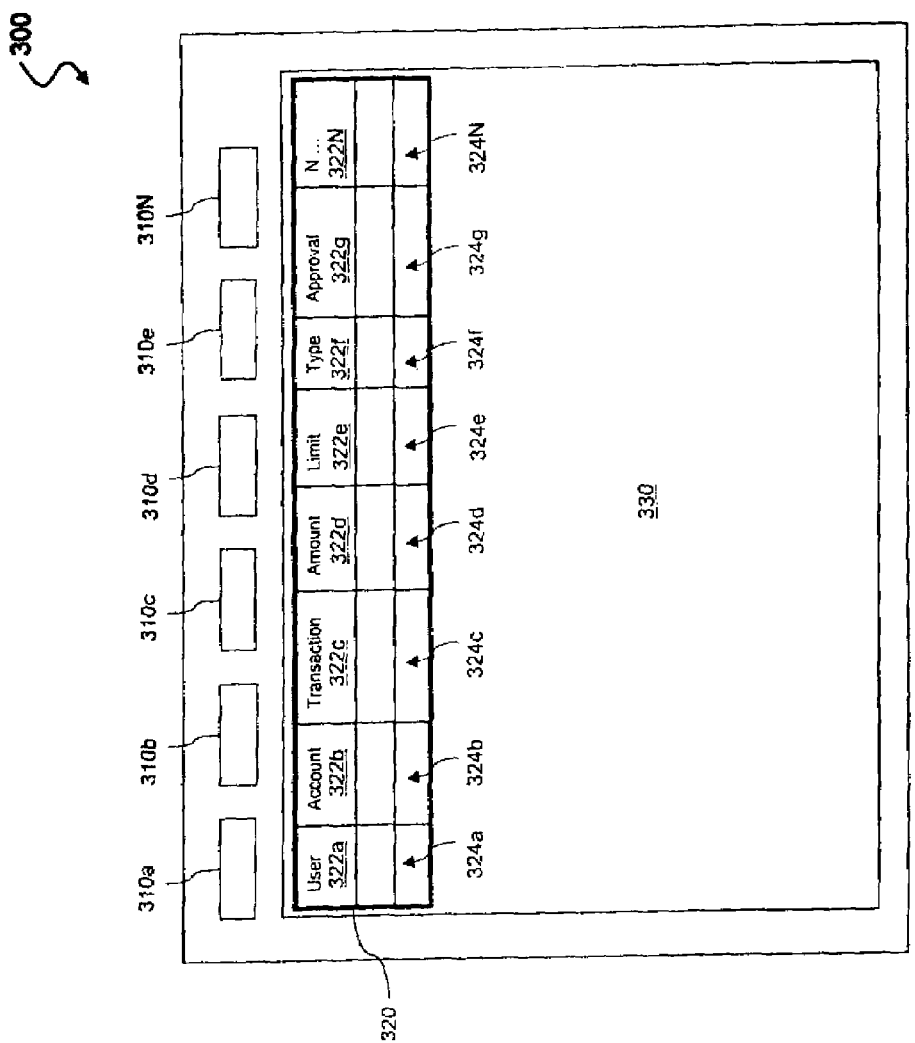
FIG. 3 illustrates one embodiment of a graphical user interface adapted for completing a pending purchase according to another aspect of the present disclosure.

The subscriber approval client 122, the subscriber approval local server 132, and the proxy subscriber approval server 140 described above may be operated with a graphical user interface (GUI) 300 as illustrated in FIG. 3. The GUI 300 may operate on the first communication device 120, the second communication device 130, and/or a general-purpose computer. The GUI 300 may also be adapted for viewing and/or editing one or more approval rules adapted for completing a pending purchase. The GUI 300 includes buttons 310a, 310b, 310c, 310d, 310e, . . . 310N, approval rules 320, and supplemental information 330.

The buttons 310a, 310b, 310c, 310d, 310e, . . . 310N may be adapted for sending approval, cut and paste of information, saving information, and/or other functions. The buttons 310a, 310b, 310c, 310d, 310e, . . . 310N may include a touch-pad and/or may be located within a display (e.g., liquid crystal display), in one embodiment.

The approval rules 320 include one or more fields 322a, 322b, 322c, 322d, 322e, 322f, 322g, . . . 322N. The fields 322a, 322b, 322c, 322d, 322e, 322f, 322g, . . . 322N may include categories of information such as user, account number, transaction (i.e. description of pending purchase), amount, limit, approval, and/or other categories of information. The fields 322a, 322b, 322c, 322d, 322e, 322f, 322g, . . . 322N also each include one or more field associated information 324a, 324b, 324c, 324d, 324e, 324g, . . . 324N.

The supplemental information 330 includes other information associated with the approval rules 320. For example, the supplemental information 330 may include a log depicting times and dates when one or more of the approval rules 320 are invoked. Of course, the supplemental information 330 may also include other information that may be associated with the activity of the subscriber approval client 122, the subscriber approval local server 130, and/or the proxy subscriber approval server 140.

Figure 4:
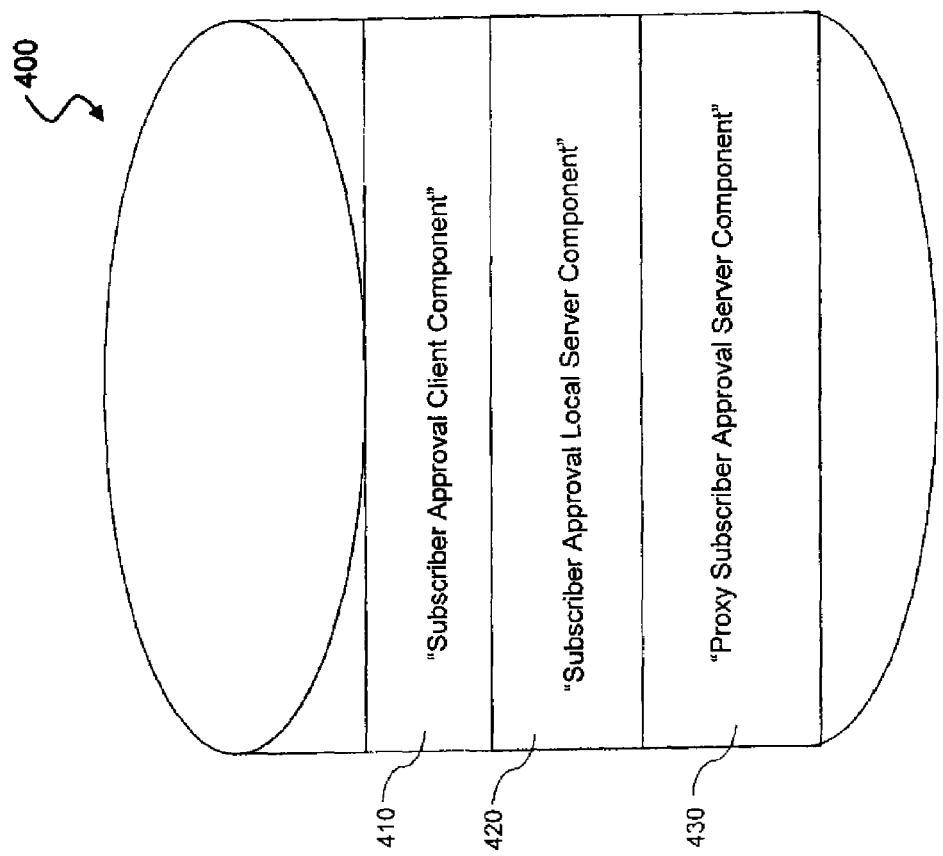
FIG. 4 illustrates an exemplary system suitable for implementing the several embodiments of the present disclosure.

Referring now to FIG. 4, a block diagram depicts a computer-readable medium 400 constructed according to aspects of the present disclosure. The medium 400 includes one or more executable computer programs. The medium 400 includes a subscriber approval client component 410, a subscriber approval local server component 420, and a proxy subscriber approval server component 430. In one embodiment, the subscriber approval client component 410, the subscriber approval local server component 420, and the proxy subscriber approval server component 430 may be substantially similar in operation to the subscriber approval client 122, the subscriber approval local server 132, and the proxy subscriber approval server 140 of the system 100 of FIG. 1.

The subscriber approval client component 410 may operate according to one or more software routines, which may invoke responses from the subscriber approval local server component 420, and/or the proxy subscriber approval server component 430.

The subscriber approval local server component 420 may operate according to one or more software routines, which may provide approval of pending purchase information associated with the subscriber approval client component 410. The subscriber approval local server component 420 may reside within the same computer-readable medium or may be located on remote computer-readable medium, in one embodiment.

The proxy subscriber approval server component 430 may operate according to one or more software routines, which may provide approval of pending purchase information associated with the subscriber approval client component 410. The subscriber approval local server component 420 may be located on remote computer-readable medium or may be located on the same computer-readable medium of the subscriber approval local server 420.

The subscriber approval client 122, the subscriber approval local server 132, and/or the proxy subscriber approval server 140 described above may be implemented on any communication device such as is well known to those skilled in the art. An exemplary communication device 500 for implementing one or more embodiments of the subscriber approval client 122, the subscriber approval local server 132, and/or the proxy subscriber approval server 140 disclosed herein is illustrated in FIG. 5a. The system 500 includes a processor 502 (which may be referred to as a central processor unit or CPU) that is coupled to memory devices including a read only memory (ROM) 504, a random access memory (RAM) 506, a first transceiver 508 that is coupled to a first antenna 510, an optional second transceiver 512 that is coupled to an optional second antenna 514 to support an optional multiple-input/multiple-output (MIMO) physical layer operation mode, and an input/output (I/O) device 516. The processor 502 may be implemented as one or more CPU chips.

The ROM 504 is used to store instructions and perhaps data, which are read during program execution. ROM 504 is a non-volatile memory device. The RAM 506 is used to store volatile data and perhaps to store instructions. The ROM 504 may include flash memories or electrically erasable programmable memory to support updating the stored instructions remotely, for example through an over-the-air interface via the transceivers 508 and/or 512 and the antennas 510 and/or 514.

The transceivers 508, 512 and the antennas 510, 514 support wireless, or other types of communications. The I/O device 516 may be a keypad and a visual display such as a liquid crystal display to permit entering numbers and selecting functions. Alternatively, the I/O device 516 maybe a keyboard and a touch pad, such as a keyboard and a touch pad of a laptop computer. The processor 502 executes instructions, codes, computer programs scripts, which it accesses from ROM 504 or RAM 506.

Figure 5B:
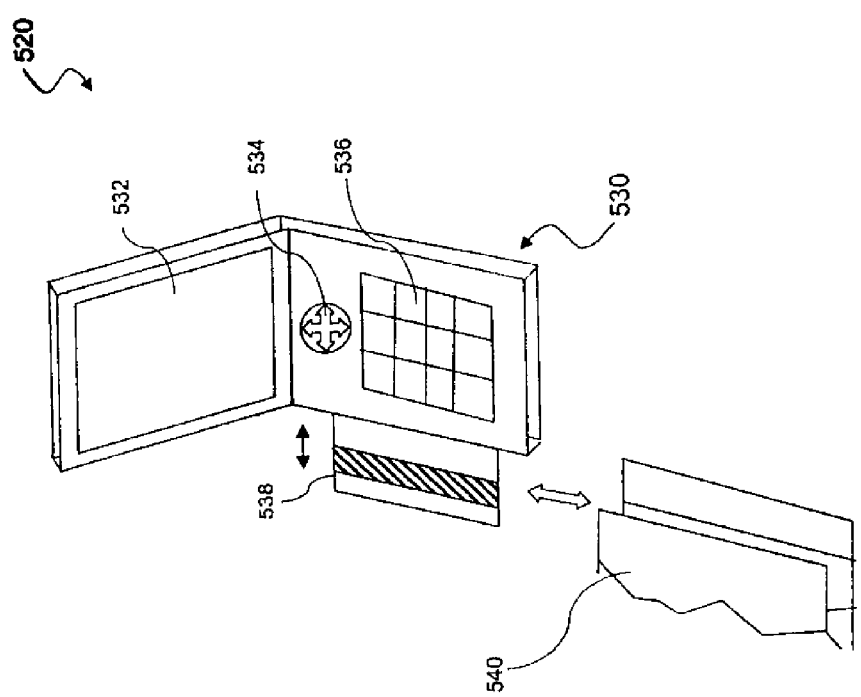
FIG. 5b illustrates an exemplary system suitable for implementing an embodiment of the present disclosure.

Referring now to FIG. 5b, a sketch illustrates a system 520 for completing a pending purchase. The system 520 includes a mobile device 530 and a POS interface 540. The mobile device 530 may be substantially similar to the first communication device 120 and/or the second communication device 130 of the system 100 of FIG. 1. The mobile device 530 may also include the embodiments of the system 500 as described above. The mobile device 530 includes a display 532, a touch pad 534, a keypad 536, and a contactless chip 538. The mobile device 530 may interact with the POS interface 540 using the contactless chip 538. The POS interface 540 may also be substantially similar to the POS 102 of the system 100 of FIG. 1. In one embodiment, the contactless chip 538 may be configurable or programmable by the mobile device 530. The second communication device 130 and/or the proxy subscriber approval server 140 may configure or program the contactless chip 538 with one or more account numbers. In another embodiment, an alternate communication means may be employed to establish a communication link between the POS interface 540 and the mobile device 530, including contact points such as a docking station.

Figure 6:
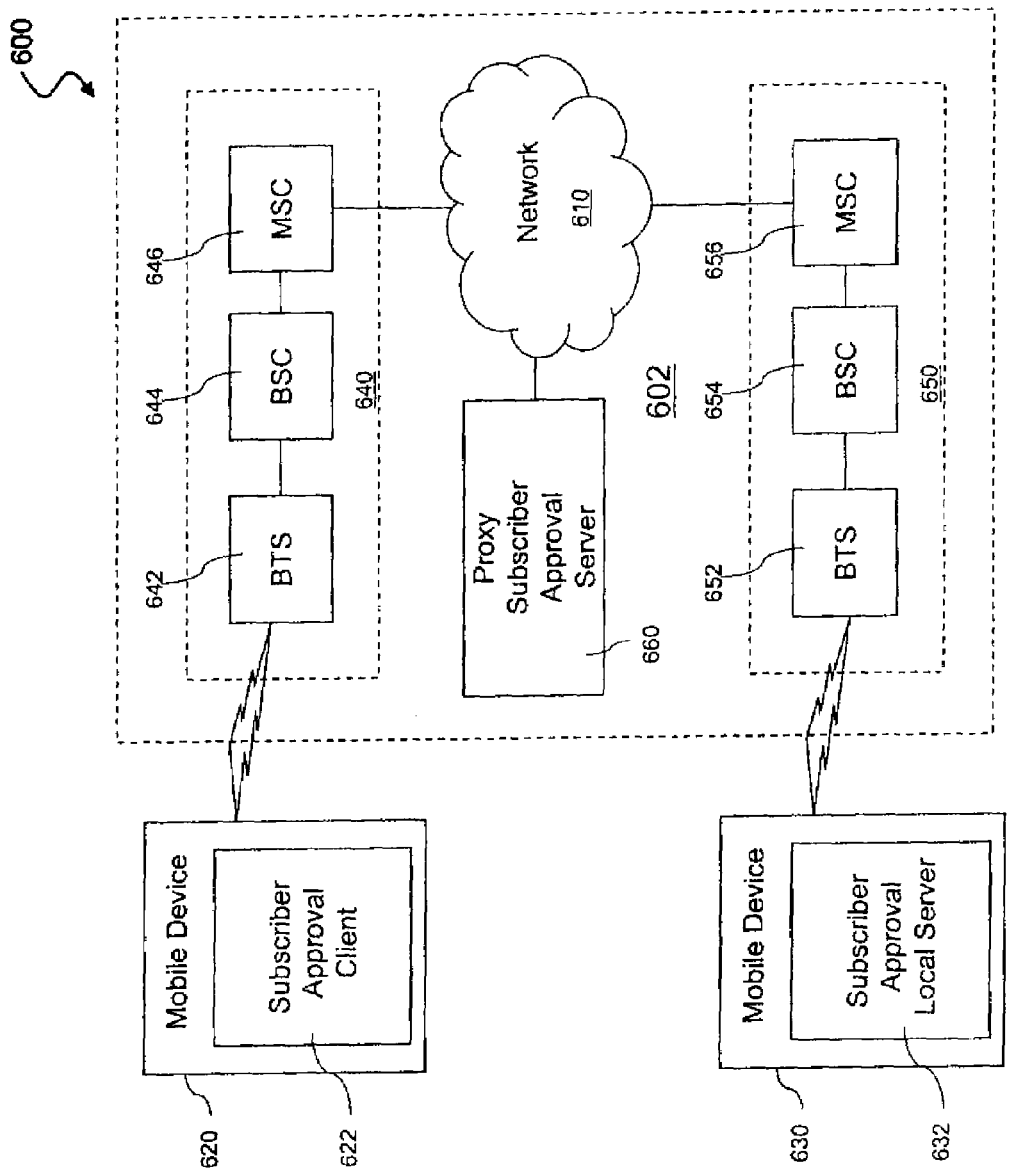
FIG. 6 illustrates an exemplary system suitable for implementing the several embodiments of the present disclosure.

Turning now to FIG. 6, an information technology (IT) system 600 operable to support subscriber payment approval is depicted. The IT system 600 supports subscriber payment approval and is not limited to payment approval through the subscriber approval client 122, subscriber approval local server 132, and/or proxy subscriber approval server 140 as discussed earlier. The IT system 600 includes an information technology (IT) infrastructure 602, and wireless mobile device 620, and 630. The wireless mobile device 620, 630 is in communication with the IT infrastructure 602 through a wireless network 640, 650. The wireless mobile device 620 contains a subscriber approval client 622. The wireless mobile device 630 contains a subscriber approval local server 632. The wireless network 640, 650 is in communication with a network 610. In an embodiment, the network 610 may include the Internet, a public switched telephone network (PSTN), and/or other networked systems.

The subscriber approval client 622 and the subscriber approval local server 632 may be a computer program or application, which may execute on a general-purpose computer system. The subscriber approval client 622 and the subscriber approval local server 632, in one embodiment may be substantially similar to the subscriber approval client 122 and the subscriber approval local server 132 of the system 100 of FIG. 1.

The wireless network 640, 650 and the network 610 provide the communications link between the subscriber approval client 622 and the subscriber approval local server 632. It is contemplated that the system 600 may be employed to implement approval of pending purchase transactions associated with the wireless mobile device 620 in real-time through the wireless mobile device 630. In one embodiment, the IT infrastructure 602 may be operable for real-time transaction approval without the wireless mobile device 630. For example, a pending purchase transaction may be approved by a proxy subscriber approval server 660. The proxy subscriber approval server 660, in one embodiment, may be substantially similar to the proxy subscriber approval server 140 of the system 100 of FIG. 1. The proxy subscriber approval server 660 may also communicate with the network 610 through a wireless and/or wireless network.

The wireless network 640, 650 may comprise a transceiver in wireless radio communication with the wireless mobile device 620, 630, a bridge node linking to the network 610, such that the transceiver is in communication with the bridge node. The bridge node may link the wireless network to a packet data network (PDN), the PDN may be in communication with the subscriber approval client 622, the subscriber approval local server 632, and/or the proxy subscriber approval server 660 may be in communication via the wireless network 640, 650 and the PDN.

In one embodiment, a base transceiver station (BTS) 642, 652 is in radio communication with the wireless mobile device 620, 630, a mobile switching center (MSC) 646, 656 bridges the wireless network 640, 650 to the network 610, and a base station controller (BSC) 644, 654 links the BTS 642, 652 with the MSC 646, 656.

In another embodiment, the BTS 642, 652 is in radio communication with the wireless mobile device 620, 630, a gateway global packet radio system support node (GGSN) bridges the wireless network 640, 650 to the PDN, a base station controller (BSC) 644, 654 links the BTS 642, 652 to a serving global packet radio system support node (SGSN), and the SGSN is in communication with the GGSN.

Other wireless network topologies are also possible. The construction of information technology systems is well understood by those skilled in the art. The IT system 600 employs the IT infrastructure 602 merely as a link between the wireless mobile device 620 and 630.

Figure 7:
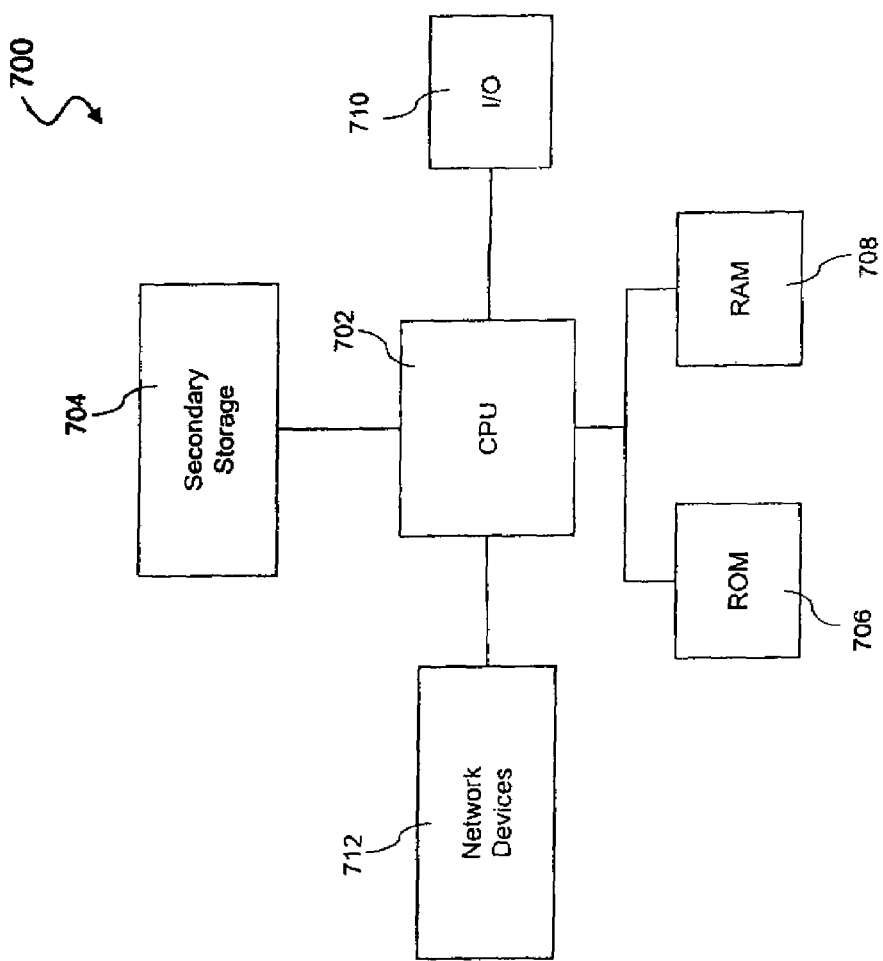
FIG. 7 illustrates an exemplary general-purpose computer system suitable for implementing the several embodiments of the present disclosure.

Portions of the system 100 and the IT system 600 described above may be implemented on one or more general-purpose computers with sufficient processing power, memory resources, and network throughput capability to handle the necessary workload placed upon it. FIG. 7 illustrates a typical, general-purpose computer system suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

The secondary storage 704 is typically comprised of one or more disk drives or tape drives and is used for non-volatile storage of data and as an over-flow data storage device if RAM 708 is not large enough to hold all working data. Secondary storage 704 may be used to store programs, which are loaded into RAM 708 when such programs are selected for execution. The ROM 706 is used to store instructions and perhaps data, which are read during program execution. ROM 706 is a non-volatile memory device, which typically has a small memory capacity relative to the larger memory capacity of secondary storage. The RAM 708 is used to store volatile data and perhaps to store instructions. Access to both ROM 706 and RAM 708 is typically faster than to secondary storage 704.

I/O devices 710 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 712 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Code Division Multiple Access (CDMA) and/or Global System for Mobile Communications (GSM) radio transceiver cards, and other well-known network devices. These network connectivity devices 712 may enable the processor 702 to communicate with an Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave generated by the network connectivity devices 712 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of completing a pending purchase, comprising:
   receiving a purchase information by a first communication device from a point-of-sale device;
   transmitting a subscriber approval request from the first communication device to a second device, the subscriber approval request including the purchase information;
   providing a payment information from the first communication device to the point-of-sale device to complete the pending purchase upon receiving a subscriber approval response from the second device; and
   transmitting the payment information from the point-of-sale device to an authorization entity to authorize charging for the pending purchase.

2. The method of claim 1, further comprising:
   receiving the subscriber approval request;
   alerting a user of the subscriber approval request;

receiving an approval response input from the user;

transmitting the subscriber approval response based on the approval response input; and receiving the subscriber approval response, the subscriber approval response including a decision about the subscriber approval request.

3. The method of claim 1, wherein determining the subscriber approval response is performed by the second device, and wherein the second device is further defined as a server provided with rules that responds to a request from the first communication device based on the rules.

4. The method of claim 1, further including determining the subscriber approval response, the determining performed by the first communication device after expiration of a time period of no reply from the second device.

5. The method of claim 1, wherein the second device is further defined as a second communication device, and further including determining the subscriber approval response, the determining performed by a proxy server after expiration of a time period of no reply from the second communication device.

6. The method of claim 1, wherein the second device is further defined as a second communication device, and wherein the receiving the information about the pending purchase is performed by a first communication device, the transmitting the subscriber approval is performed by the first communication device to a second communication device, and the determining the subscriber approval response is performed by one or more approval rules.

7. The method of claim 6, wherein the one or more approval rules are located in an entity selected from the group comprising of the first communication device, the second communication device, and a proxy server.

8. The method of claim 1, wherein the payment information is not provided from the first communication device to the point-of-sale device to complete the pending purchase when a subscriber rejection response is received from the second device.

9. The method of claim 8, wherein determining the subscriber approval response is based on one or more approval rules and wherein the one or more approval rules are associated with monetary limits promulgated by a user.

10. The method of claim 8, wherein the one or more approval rules are configurable by the second device that approves the first communication device to complete the pending purchase.

11. An information technology system operable for supporting subscriber payment approval, comprising:

an information technology infrastructure that promotes management of rules related to payment approval;

an authorization entity that authorizes charging payment to an account;

a point-of-sale system that receives payment information and requests the authorization entity to authorize charging payment to the account;

a first mobile communication device in communication with the information technology infrastructure, the first mobile communication device obtains purchase information from the point-of-sale system and provides the payment information to the point-of-sale system to complete a purchase; and a second mobile communication device in communication with the first mobile communication device and the information technology infrastructure, the second mobile communication device responds to a request from the first mobile communication device to approve the first mobile communication device to provide the payment information to the point-of-sale system.

12. The system of claim 11, wherein the information technology system further comprises a proxy subscriber approval server that responds to a request from the first mobile communication device to approve the first mobile communication device to provide the payment information.

13. The system of claim 12, wherein the second mobile communication device communicates with the first mobile communication device through the proxy subscriber approval server and wherein the proxy subscriber approval server is approves the first mobile communication device to provide the payment information based on rules when the second communication device does not reply to the proxy subscriber approval server.

14. The system of claim 12, where in the first mobile communication device communicates directly to the second mobile communication device to dispute an approval rejection by the second mobile communication device.

15. The system of claim 12, wherein the first mobile communication device sends a request to the proxy subscriber approval server to approve the first mobile communication device to provide the payment information when the second mobile communication device does not respond to the first mobile communication device.

* * * * *